April 17, 1928. 1,666,744
W. G. LAIRD
GAS ABSORPTION APPARATUS
Original Filed June 24, 1919 2 Sheets-Sheet 1

Inventor
Wilbur G Laird
By His Attorney
Edmund G Borden

April 17, 1928.
W. G. LAIRD
1,666,744
GAS ABSORPTION APPARATUS
Original Filed June 24, 1919   2 Sheets-Sheet 2
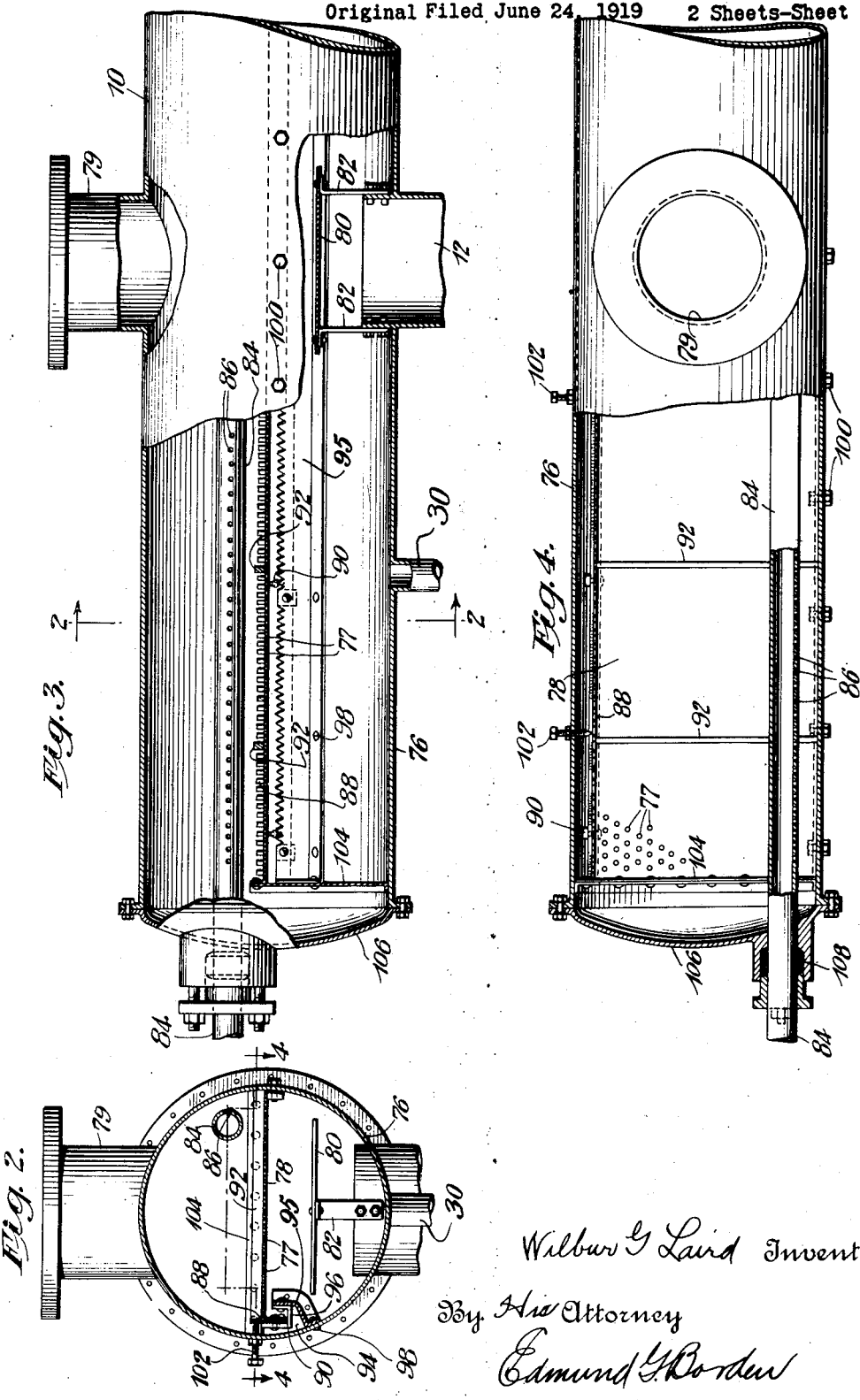
Wilbur G Laird Inventor
By His Attorney
Edmund G Borden Patented Apr. 17, 1928.

1,666,744

UNITED STATES PATENT OFFICE.

WILBUR G. LAIRD, OF NEW YORK, N. Y., ASSIGNOR TO HENRY L. DOHERTY, OF NEW YORK, N. Y.

GAS-ABSORPTION APPARATUS.

Original application filed June 24, 1919, Serial No. 306,391. Divided and this application filed November 3, 1920. Serial No. 421,442.

This invention relates to an apparatus for recovering gasoline or other hydrocarbon liquids from natural gas by absorption in oil or any suitable absorbent.

In many processes heretofore used for absorbing gasoline from natural gas, the contact between the liquid absorbent and the gas has been obtained by causing the liquid to travel downwardly through a column of coke, brick-work or other porous material and causing the gas to pass upwardly through the column. The purpose of the coke or brick work is to break the liquid into fine streams and thereby increase the surfaces at which absorption takes place. In this type of apparatus, however, it is practically impossible to obtain a uniform distribution of gas and liquid owing to variations in structure in different parts of the coke tower. Moreover, as the liquid is released at the top of the tower its flow through the tower cannot be controlled and it has a tendency to short circuit and form channels through which large streams of liquid flow. The gas also has a tendency to form gas channels or chimneys through which a large part of the gas passes without coming in contact with the liquid. Consequently, a high concentration of gasoline or other desired substance in oil or other liquid absorbing medium is difficult or impossible to obtain. Also, with this type of apparatus, it is very difficult to control the absorption of constituents which are present in very small quantities in the gas.

The primary object of the present invention is to provide an apparatus in which a greater and more uniform contact surface between the gas and oil and in which a full control of the flow of gas and oil may be obtained.

A further object of the invention is to provide an apparatus by which the absorption of hydrocarbon vapors in gas under any desired pressure may be accurately controlled.

A further object of the invention is to provide an absorption apparatus in which the absorbing medium may be maintained as a constantly changing body of uniform cross-sectional area.

The accompanying drawings show an apparatus in which may be carried out a process embodying the preferred form of the invention, of which:

Fig. 2 is a vertical sectional view of the gasoline absorber taken on line 2—2 of Fig. 3.

Fig. 3 is a view, in elevation, of the absorber, parts being broken away to illustrate the interior construction, and Fig. 4 is a horizontal sectional view of the absorber taken on line 4—4 of Fig. 2.

Figure 1:
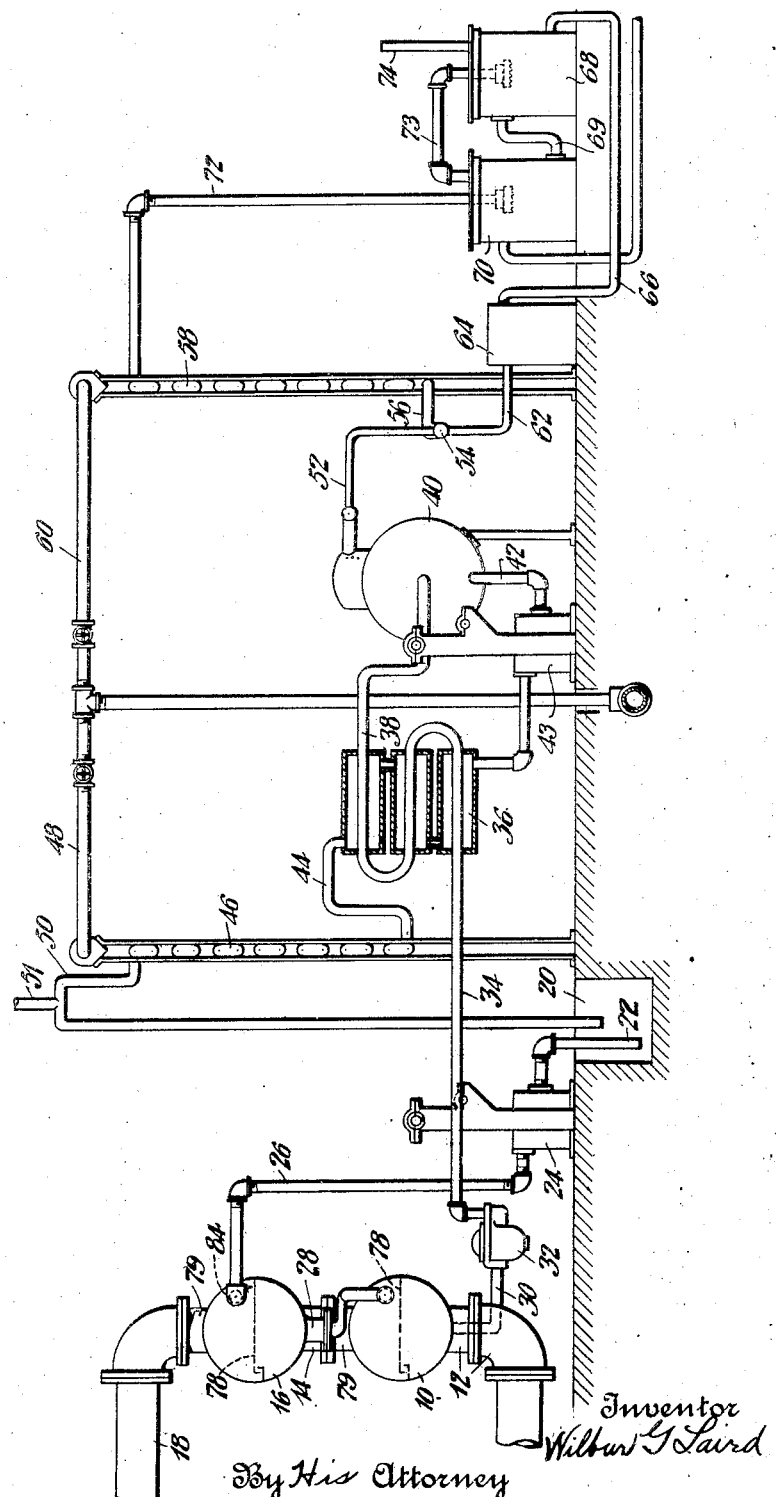
Fig. 1 is a diagrammatic view in end elevation of an apparatus for recovering gasoline from natural gas.

This application constitutes a division of my former application, Serial No. 306,391, filed June 24, 1919, now Patent #1,541,514 issued June 9, 1925, for process of and apparatus for recovering gasoline or other hydrocarbon liquids from natural gas.

The manner in which the oil vapors of natural gas are absorbed in the apparatus shown in the drawings constitutes an important feature of the present invention. This absorption is effected by causing a thin film of absorbing oil to pass in a horizontal layer across the absorption chamber, and in causing fine streams of gas to pass upwardly through the layer of oil in such a way that the oil will be blown into a fine foam. As this oily foam advances across the absorption chamber additional streams of gas are passed through the foam so that the bubbles are broken up and re-formed. In this way the oil is held in the thinnest possible film and this film contacts on both sides with the gas to be treated. This insures that the gas and oil are intimately brought into contact over an enormous area.

The oil to be used as an absorbing medium for the hydrocarbon vapors in the gas will ordinarily be a petroleum oil from which the naphtha and other lighter constituents have been distilled. However, any type of hydrocarbon oil, which is not saturated with naphtha and light hydrocarbons, may be employed, or crude oil itself may be employed in this absorption. Any hydrocarbon vapors present in the gas, which can be maintained in a liquid condition at ordinary temperatures will be absorbed and can be later recovered from the oil to form commercial grades of naphtha, gasoline and other light oils.

In treating gases, under high pressure, the apparatus should be as small and compact as possible in order that strength may be obtained without making the walls of the absorber excessively thick. Due to the efficient scrubbing action of the absorbing liquid foam and the consequent short distance of travel of the absorbing liquid, it is possible to use a horizontally arranged cylindrical container of comparatively small diameter.

To separate the hydrocarbon vapors from natural gas with the apparatus shown in Fig. 1, of the drawings, the natural gas under the line pressure enters the bottom of an absorber 10 through a pipe 12 where the gas passes through, and comes in contact with, a layer of absorbing oil to remove the major portion of the hydrocarbons. From the absorber 10 the gas passes through a pipe 14 to a second absorber 16 in which the gas passes through, and comes in contact with, a fresh supply of absorbing oil where all of the available hydrocarbon vapors in the gas are absorbed. The gas freed from the hydrocarbon vapors then passes from the absorber 16 through a pipe 18 to a gas main.

The oil to be used as an absorbing liquid is drawn from a sump 20 through a pipe 22 by means of a pump 24 and is forced through a pipe 26 to the absorber 16. Here the oil absorbs the hydrocarbon vapors remaining in the gas after passing through the absorber 10. From the absorber 16 the oil passes through a pipe 28 to the absorber 10 in which it meets a fresh supply of gas and is itself saturated with hydrocarbon vapors. The oil from the absorber 10 then passes through a pipe 30 to a pressure reducing float valve 32 which serves to prevent gas from passing through pipe 30. From the valve 32 the oil under a low pressure flows through a pipe 34 into a coil mounted in a heat exchanger 36. In the heat exchanger 36 the oil is heated by hot absorbent oil which has been heated to drive off hydrocarbon vapors previously absorbed. The oil which has been preheated in the heat exchanger 36 then passes through a pipe 38 to a still 40 where it is further heated to drive out the hydrocarbon vapors. From the still 40 the absorbent oil then flows through a pipe 42 to a pump 43 by which it is forced through the heat exchanger 36 where it gives up part of its heat to the oil passing to the still. The cooled absorbent oil then passes through a pipe 44 to be further cooled in a coil 46 which is cooled by a spray of water from the pipe 48. The cold oil is then passed to a sump or storage tank 20 through a pipe 50, provided with a siphon break 51.

The hydrocarbon vapors set free from the absorbing oil in the still 40 passes to an air cooled condenser 52 in which the heavy vapors are condensed. The uncondensed vapors from the condenser 52 collect in a manifold 54 and pass through a pipe 56 to a condenser 58 which is cooled by a spray of water from a pipe 60. The condensed vapors from the condensers 52 and 58 collect in the manifold 54 and flow through a pipe 62 to a collecting tank 64. From the tank 64 the condensed vapors flow through a pipe 66 to a bubbler 68. The condensate rises in the bubbles 68 then overflows through a pipe 69 and passes to a second bubbler 70. Uncondensed vapors from the condenser 58 pass through a pipe 72 and enter the bubbler 70 under the surface of the condensates. The vapor then passes through a pipe 73 into the condensate in the bubbler 68 to remove the last traces of vapor from the uncondensable gas. Hydrocarbon liquids which are not produced in the process may be used in the bubblers 68 and 70 to take up the uncondensed vapors from the condenser 58 and, if desired, the proper liquid may be used to produce a blended gasoline. Any vapors which are uncondensable leave the bubbler 68 through a vent 74 and may be returned to the service main 18.

The above described process of circulating and heating the absorbing oil and of condensing the hydrocarbon vapors, distilled from the oil, may be greatly varied, and is merely given as an example of one process in which the improved method and apparatus, for absorbing the hydrocarbon vapors in oil, may be operated. The invention is not limited, however, to the details set forth in the above description of the oil treating steps.

Referring more particularly to the absorbing apparatus shown in the Figs. 2, 3 and 4, the absorbers 10 and 16 consist of horizontally arranged elongated cylindrical containers 76. Since the absorbers 10 and 16 are constructed alike only the absorber 10 is illustrated in detail in Figs. 2, 3 and 4. The gas from which the hydrocarbon vapors are to be removed, enters the lower portion of the absorber 10 through pipe 12 and spreads out under a perforated partition or absorbing plate 78. The marginal sides and ends of the plate 78 make closed points on the interior of the absorber so that the gas cannot pass around the margin of the plate but must pass through small openings 77 formed over the entire surface of the plate. A thin layer of the absorbing oil is maintained on the plate 78 so that gas passing through the openings 77 will pass through the layer of oil. The openings 77 in the plate 78 should be of such a size that they will not be clogged by tar and other impurities in the gas, and will not permit the liquid to flow down through the partition when gas is flowing upwardly. The openings should also be of such a size that the gas streams passing through will beat the layer of absorbing oil into foam. When a difference of pressure, for instance, of a little above one-half inch of water is maintained between the pressure above and below the partition, openings 77 of about one-eighth of an inch in diameter may be used. The above dimension may, however, be varied to suit the particular conditions under which the apparatus is to be used, and especially the kind of absorbing liquid used. In passing through the layer of absorbing oil the hydrocarbon vapors in the gas are absorbed. As the gas emerges from the absorbing fluid it collects above the partition 78 and leaves the container 76 through pipe 79.

The gas inlet pipe 12 extends upwardly into the cylindrical container a short distance in order to prevent the absorbing oil which collects in the bottom of the container 76 from flowing down through this pipe. A baffle 80 is supported above the pipe 12 by supports 82 to prevent the gas from impinging directly upon that part of the partition directly above the pipe 12 and to throw the gas outwardly towards the ends of the container 76.

The oil for absorption enters the absorbers through a pipe 84, which extends along the entire length of the absorbers, and is arranged to distribute oil as a substantially uniform layer on the plate 78. The oil entering the pipe 84 leaves through a number of small holes 86, spaced at short intervals along the entire length of the pipe. The holes 86 face the wall of the absorber so that the oil which is forced through the openings 86 strikes the wall of the container 76 and flows in a thin film onto the plate 78. By having the openings 86 in the pipe 84 very close together, the oil is formed into a substantially continuous uniform layer throughout the length of the partition 78 before it is introduced upon the partition 78. When the oil from the pipe 84 reaches the partition 78 the gas passing up through openings 77 immediately forms the layer of oil into a fine foam, thereby bringing the oil and gas into very intimate contact under such conditions that the hydrocarbon vapors are effectively absorbed from the gas. As the foam continues to pass over the partition more gas enters the foam and the bubbles are continuously broken up and new surfaces are exposed to the gas.

In order to obtain high concentration of the hydrocarbon vapors in the absorbent oil the thickness of the layer of absorbent oil on the partition 78 should be accurately controlled. For instance, a thickness of about one-eighth of an inch measured when no gas is flowing through the partition may be used. To maintain any desired thickness of layer an adjustable weir 88 is mounted at the overflow edge of the partition 78. The weir 88 consists of a serrated or sawtooth plate which is held in place on the partition 78 by means of bolts 90 that pass through vertical slots in a downwardly extending flange portion of the plate. The slot and bolt mounting of the weir plate permits a vertical adjustment to vary the thickness of the layer on the partition 78. The indentations forming the sawtooth edge of the weir form the spaces through which the liquid overflows from the plate 78. The aggregate width of the passages for the liquid is but a fraction of the entire length of the weir, and an unevenness in the weir does not so seriously affect the thickness of the layer as would be the case if a straight edged weir were used.

Owing to the thinness of the layer of oil and the length of the cylindrical container a slight difference in the level of the two ends of the container would cause a proportionately large part of the absorbent oil to flow toward the low end and might uncover some of the openings at the higher end. To counteract this tendency transverse dams 92 are provided which divide the upper surface of the partition 78 into sections. As the difference in level at the ends of each section cannot be very great this tendency to unevenness in the film is practically eliminated.

The partition 78 does not extend entirely across the absorber, and the absorbing liquid overflows along the entire length of one longitudinal edge. To permit the liquid to pass around the edge of the plate 78 while preventing gas from flowing around the edge, the liquid overflows into a liquid seal 94. This seal is formed by having the flange on the edge of the plate 78 together with the weir plate 88 extend down into a trough of liquid which accumulates from the plate 78, such trough being formed on the side wall of the container by an upwardly extending plate 95 which extends in a horizontal position along the container the full length of the plate 78. The upper edge of the liquid seal plate 95 is serrated and the liquid rising in the seal overflows through the serrations into the lower part of the container 76 from which it is withdrawn by the pipe 30.

It is obvious that the shape of the absorbers 10 and 16 might be varied within certain limits. In treating gases under pressure, however, a cylindrical absorber of the type above described is preferred because it has the advantage of great strength and compactness.

In assembling the above apparatus the liquid seal 95 which has supporting lugs 96 is fastened to the side of the absorber by means of bolts or rivets 98. The baffle 80 is then set in place. The partition 78 is next inserted and fastened to one side by bolts or rivets 100 and rests on its other edge on the lugs or supports 96 of the liquid seal plate 95. Owing to the difficulty of getting at that end of the partition which rests in the liquid seal and fastening it so as to prevent it from rising under the gas pressure, screws 102 are inserted through the side of the absorber 76 and arranged to engage the weir 88. End plates 104 are then put in place and fastened by bolts, rivets or other means to the partition 78 and to the liquid seal plate 95 so as to form a gas and liquid tight connection. Cylinder heads 106 are then fastened on the cylindrical absorbers and the pipe 84 is inserted and made gas tight by means of the packing gland 108.

The apparatus described above is especially advantageous in cases in which a large volume of gas is treated with a comparatively small volume of absorbing liquid, and in which the absorption takes place slowly. It produces an enormous surface at which the constituents to be absorbed may be taken up by the absorbing liquid. In some cases there is no chemical reaction between the constituents to be absorbed and the absorbing medium, and there is a consequent progressively decreasing power to absorb the constituents as the concentration of those constituents increase. In such cases the above apparatus has the advantage that, owing to the small amount of absorbing liquid used in the absorber, and the rapid passage of the absorbent through the absorber, the saturated portion of the absorbent liquid is continuously removed as soon as it is saturated and does not mix with the fresh absorbent to lower the absorbing action of the incoming fresh absorbent.

While the apparatus has been described in connection with a process for recovering hydrocarbon vapors from natural gas, it is obvious that it may be used to absorb other materials from natural gas or from other gases. Thus, sulphur compounds are often present in very small amounts in the gas, and because of the offensive odor of their combustion products, must be entirely removed. This impurity can be removed most effectively when the gases are under pressure and the concentration correspondingly increased. For this and similar purposes, the above described apparatus is well adapted.

I claim as my invention:

1. An apparatus for absorbing gas under pressure in liquids which comprises a horizontal cylindrical container, a perforated substantially horizontal partition in said cylindrical container, means for uniformly feeding liquid at one edge of said partition, means for uniformly removing the liquid from the other edge of the partition, means for introducing gas under the partition and removing gas from above the partition and dams at right angles to the axis of the container dividing the surface of the partition into sections.

2. An apparatus for absorbing gas under pressure in a liquid comprising a horizontal cylindrical container, having a gas inlet in the lower part and a gas outlet on the upper part of the cylinder, a substantially horizontal perforated partition fastened on one side of the wall of the cylinder, a liquid seal at the other side of the cylinder, a flange depending from said partition and extending into said liquid seal, vertical partitions extending from the ends of the partition to the bottom of the cylinder to form a chamber below said partition, a liquid inlet pipe extending above the side of the partition opposite the liquid seal, and provided with a number of openings closely spaced throughout the length of the partition, an adjustable serrated weir on that edge of the partition over the liquid seal and dams on the partition extending across the partition at right angles to the length of the cylinder.

3. An apparatus for absorbing gas under pressure in liquid comprising an elongated horizontal container, a substantially horizontal perforated partition in the container, a continuous liquid seal extending substantially the entire length of one edge of the partition, liquid distributing means above and extending substantially the entire length of the other edge of the partition and means for introducing gas beneath said partition.

4. An apparatus for absorbing gas in liquids comprising an elongated horizontal cylinder, a substantially horizontal perforated partition in the cylinder, a liquid distributing pipe above and at one edge of the partition, distributing dams on said partition at right angles to the axis of the cylinder and means for introducing gas beneath said partition.

5. An apparatus for absorbing gas in liquids comprising a container, a substantially horizontal perforated partition in the container, a liquid distributing pipe above and at one edge of the partition, distributing dams on said partition and extending in the direction of flow of the liquid over said partition and means for introducing gas under said partition.

6. An apparatus for absorbing gas in liquids comprising a container, a substantially horizontal perforated partition in the container, a liquid distributing pipe above and extending along one of the edges of the partition, an adjustable weir mounted on and extending substantially the entire length along the opposite edge of said partition and means for introducing gas under said partition.

In testimony whereof I affix my signature.

WILBUR G. LAIRD.